United States Patent [19]

Saito et al.

[11] 4,273,232

[45] Jun. 16, 1981

[54] PASSENGER CONVEYOR BALUSTRADE

[75] Inventors: Cyuichi Saito; Katsuya Teranishi, both of Katsuta, Japan

[73] Assignee: Hitachi, Ltd., Tokyo, Japan

[21] Appl. No.: 952,985

[22] Filed: Oct. 20, 1978

[30] Foreign Application Priority Data

Oct. 28, 1977 [JP] Japan ............................... 52-128762

[51] Int. Cl.³ ........................ B65G 15/00; B65G 17/00

[52] U.S. Cl. ........................................ 198/335; 72/701

[58] Field of Search ................................ 198/335-338; 72/701

[56] References Cited

U.S. PATENT DOCUMENTS 2,943,587 6/1960 Samuelsson ........................ 72/701 X 3,568,813 3/1971 Schaeffer ............................ 198/335

3,712,447 1/1973 Boltreu et al. ....................... 198/335

*Primary Examiner*—Bruce H. Stoner, Jr.

*Assistant Examiner*—Douglas D. Watts

*Attorney, Agent, or Firm*—Craig and Antonelli

[57] ABSTRACT

A balustrade for use with passenger conveyors including a deck member bent to assume an arcuate shape at landings and having a U-shaped cross-section with its opening facing the center of the arc, said deck member being formed adjacent the opposite ends of said first arcuate-shaped portion with second arcuate-shaped portions of larger radius of curvature than that of the first arcuate-shaped portion, said deck member being inwardly folded down about the opening of the arcuate-shaped portions to provide deformation preventing strips.

4 Claims, 14 Drawing Figures

PASSENGER CONVEYOR BALUSTRADE

This invention relates to a balustrade for use with passenger conveyors such as escalators, electrically operated passageways and the like and, more particularly, to a balustrade which is formed of stainless steel sheets.

Passenger conveyors have spread widely as fixture which is indispensable to a building as a means for satisfying the needs of persons who utilize the building. In recent years, a variety of demands have been put forward for industrial designs of balustrades. As is well known, the balustrade constitutes a major part of a designed body in the passenger conveyor, and it is generally recognized by the parties concerned that whether the balustrade has an attractive industrial design or not is a major selling point in respect of making a discrimination among room designs.

As described in U.S. Pat. Nos. 3,321,059 and 3,353,650, the balustrade includes stationary members except for an endless series of steps adapted to convey passengers thereon, and moving parts such as handrails. As described above, each balustrade includes, as main components thereof, a main deck member upon which handrail is mounted, a lower deck member and a glass panel, all of which constitutes an object for industrial design. It is conventional to form the main and lower deck members by extruded material of aluminum alloy, of which surfaces have been subjected to alumite treatment.

Aluminum alloy material has been widely used for the main and lower deck members of a balustrade since it is advantageous in its formability into substantially complex shapes. However, the use of this material has a disadvantage in that the manufacturing cost thereof continues to be increased due to high electric power consumption and the raw material therefor tends to be reduced. However, what is more significant than the high manufacturing cost is the fact that aluminum alloy material is relatively soft (as compared to such metallic materials as steel) to be readily marred. This presents a serious problem in which the respective members of balustrade present scratches and impressions on the inner sides thereof facing the steps after the members have been contacted by a large number of passengers during several years of operation. Thus such passenger conveyors present an unsightly appearance. Additionally, in the case of passenger conveyors installed in underground markets, corrosion of the material of the balustrades caused by underground water adds to deterioration of the industrial design of the balustrades.

Therefore, stainless steel sheets have begun to be used in place of aluminum alloy material, which sheets are superior to the latter in price stabilization, hardness and anticorrosive resistance. However, the use of stainless steel for balustrades raises the technical problems of the material being deformed during bending, as described hereinafter. Since these problems have not been solved satisfactorily, the practice of using a stainless steel sheet has not yet become popular.

It is an object of the present invention to provide a balustrade for passenger conveyors which is highly productive and obviates the aforementioned problem of deformation during bending.

The object of the present invention can be attained by a balustrade for use with passenger conveyors including a handrail guide for guiding a handrail adapted to be moved in synchronism with an endless series of steps, a first deck member and a second deck member connected to the first deck member and having a U-shaped cross-section with its opening facing the opposite side of the handrail, each of said first and second deck members being bent to assume an arcuate shape at landings, said second deck member being formed adjacent the opposite ends of said first arcuate-shaped portion with second arcuate-shaped portions of larger radius of curvature than that of the first arcuate-shaped portion, said second deck member being inwardly folded down about the opening of the arcuate-shaped portions to provide deformation preventing strips.

DESCRIPTION OF THE DRAWING

As shown in FIGS. 1 and 2, a passenger conveyor comprises balustrades each including stationary members disposed above steps except for an endless series of steps 1 for conveying passengers thereon, and a handrail 2. The stationary members comprise mainly a main deck member 3 for supporting the handrail 2, a guide deck member 4, a lower deck member 5 and a glass panel 6, all of which are objects of industrial design, together with auxiliary parts such as fasteners 7 and guide rollers 8. A material for balustrades is, first of all, required to have a good bending workability since the contour of balustrade consists of concave or U-shaped curve, T-shaped terminal curve and unique, streamlined arcs.

Problems encountered when a balustrade deck member made of stainless steel material is subjected to bending will be described hereinbelow by referring to the main deck member 3 at the semi-circular terminal end of the balustrade by way of example.

Figure 1:
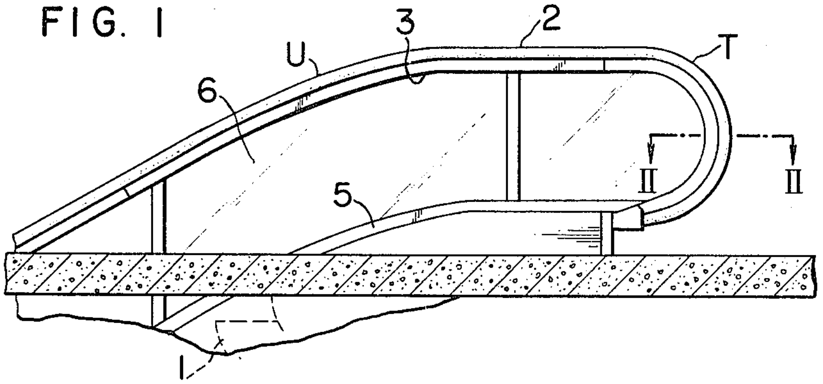
FIG. 1 is a side elevational view of a portion of a passenger conveyor adjacent an upper landing.
Figure 2:
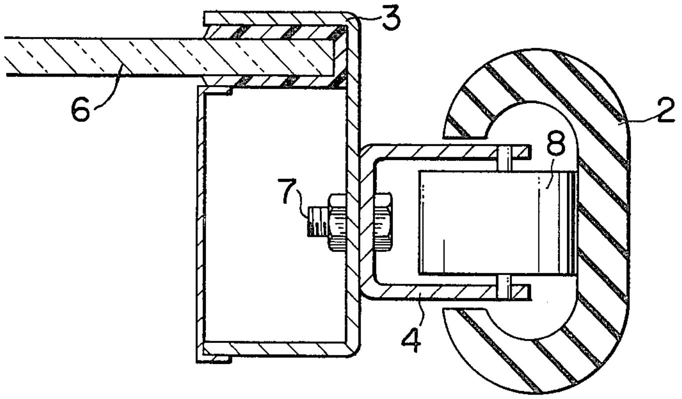
FIG. 2 is a sectional view taken along the line II—II in FIG. 1, showing a conventional balustrade having deck members made of stainless steel material.
Figure 3:
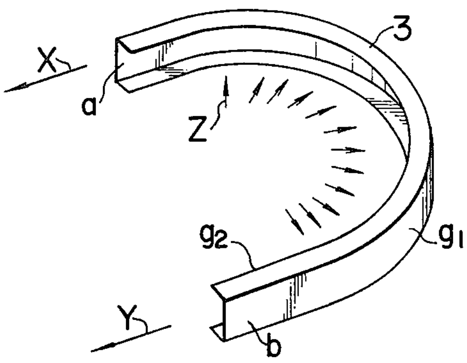
FIG. 3 is a perspective view showing a deck member being subject to bending.
Figure 4:
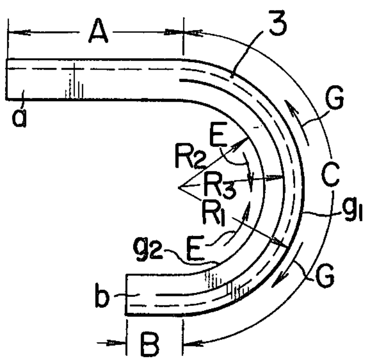
FIG. 4 is a side view of a deck member.
Figure 6:
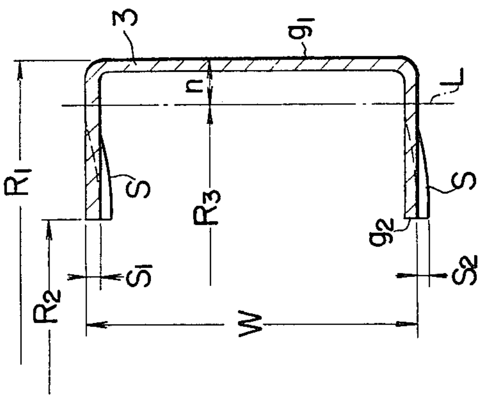
FIG. 6 is a sectional view taken along the line VI—VI in FIG. 5.
Figure 5:
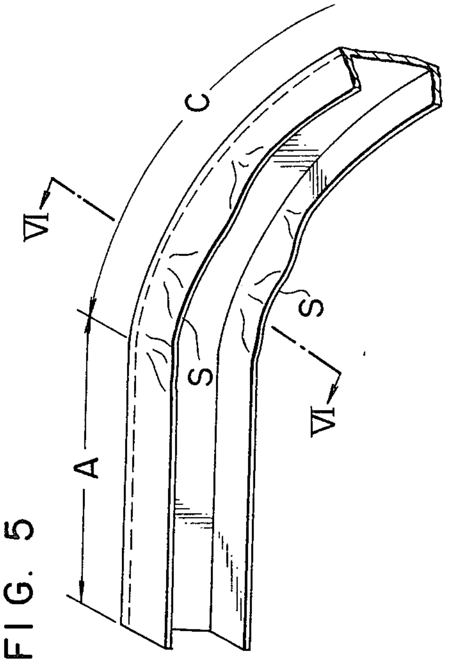
FIG. 5 is a partial, perspective view showing the manner in which the deck member is deformed.

As shown in FIGS. 3 to 6, a main deck member 3 is generally of U-shape with its opening facing inwardly, and includes straight portions A, B, and a semi-circular curved portion C, of which outer peripheral surface $g_1$ has radius of curvature $R_1$ and of which inner peripheral surface $g_2$ has radius of curvature $R_2$. As shown in FIG. 3, bending of the main deck member 3 is generally performed by uniformly exerting forces Z on the inner peripheral portion thereof and by pulling the opposite ends a, b thereof in the directions of arrows X, Y. In this case, tensile forces in the directions X, Y cause the outer peripheral surface $g_1$ to be elongated in the direction of an arrow G and the inner peripheral surface to be contracted in the direction of an arrow E. This phenomenon of elongation and contraction is ordinarily given that analysis in which the main deck member is elongated at its portion inwardly of a neutral axis L and contracted at its portion outwardly of the axis L owing to the cross-sectional configuration of the main deck member and to the bending form as shown in FIG. 4. The aforementioned contraction naturally results in wrinkles S as shown in FIGS. 5 and 6. Therefore, the flange portions of the main deck member 3 with a width of W therebetween are displaced inwardly ($S_1$) or outwardly ($S_2$), which apparently becomes a problem in design and in assembling the glass panel 6 and lower deck member 5.

As described above, the production of the wrinkles S in the member due to the contraction thereof is common knowledge to a person skilled in the art. However, the phenomenon of bending deformation presently to be discussed has been elucidated by theoretical analysis and several test runs conducted in actual practice.

More specifically, the main deck member 3 adjacent the terminal portion consists of the semi-circular curved portion C and the straight portions A and B. It has been found that the wrinkles S were produced largely in the boundaries between the semi-circular curved portion c and the straight portions A, B.

The drawbacks of the prior art method will be explained by referring to FIG. 7 in which the outer peripheral portion $g_1$ of the main deck member 3 at the terminal portion is developed and marked with arbitrarily selected uniformly spaced points and the elongation of the member 3 in each point is shown.

Figure 7:
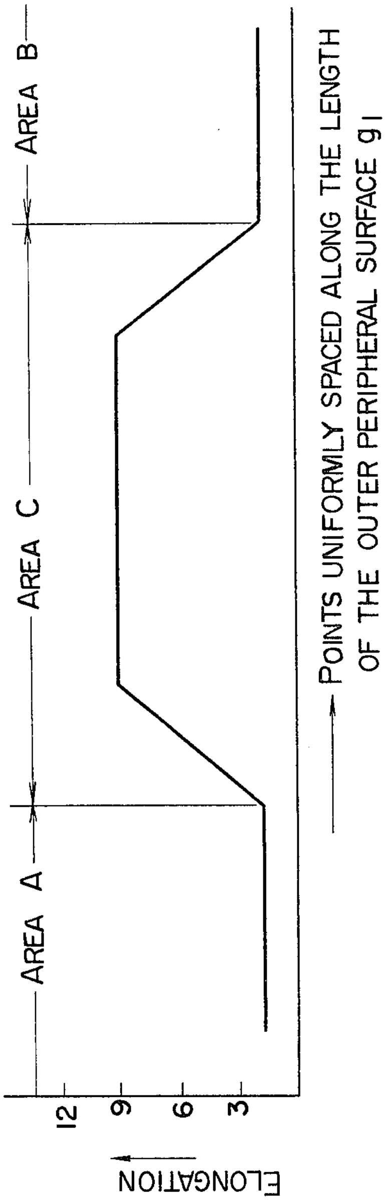
FIG. 7 is a graph showing elongation of various sections of a deck member.

FIG. 7 shows values of elongation obtained with the main deck member 3, which is formed of stainless sheet material SUS 304 having a thickness of 1.5 mm and is shaped as having an $R_1$ of 300 mm as shown in FIG. 4. It will be seen that the elongation of the deck member 3 is about 10% in the curved portion C and is about 2% in the straight portions A and B. In other words, the main deck member 3 is forced to undergo a sudden change in elongation at the curved portion which change amounts to five times as large as that of the straight portions. It will readily be understood that, as the result of this sudden change in elongation, bending deformation such as wrinkles S occurs mainly in the boundaries between the curved portion C and the straight portions A, B. It is to be noted that this inequality in elongation also occurs in cases where $R_1$ is greater than 300 mm. This is major cause for the fact that balustrades formed of stainless steel have not been widely accepted up to the present. It is also natural, of course, that the production of wrinkles S is greatly related to the position of the neutral axis L from the viewpoint of the strength of materials. As shown in FIG. 6, the neutral axis L is spaced a short distance n from the outer peripheral surface $g_1$ and a radius of curvature $R_3$ at the neutral axis L is close to radius of curvature $R_1$ of the outer peripheral surface $g_1$. Accordingly, the amount of contraction near the inner peripheral surface $g_2$ becomes great to naturally manifest itself as wrinkles S.

In the case of balustrades formed of aluminum, it is possible to assimilate wrinkles by increasing the thickness of portions where wrinkles tend to be produced. However, such measure can not be applied to balustrades formed of thin stainless steel plate.

In order to remove objectionable wrinkles, there is no other way available than such an inefficient measure as heating the member to elevated temperatures and subjecting the same to manual hammering. This manual operation poses serious problems in which the balustrade is deteriorated in its industrial design and is increased in cost.

As aforesaid, wrinkles produced in balustrades formed of stainless steel is directly caused by the following factors:

1. A sudden change in elongation particularly in the boundaries between the straight portions and the curved portion;

2. The positioning of the neutral axis of the balustrade member remote from the inner peripheral surface in which wrinkles are likely to be produced.

Figure 8:
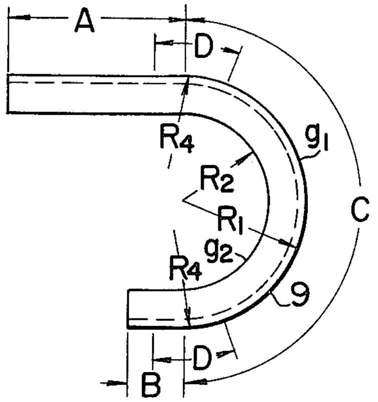
FIG. 8 is a side view showing a deck member according to an embodiment of the present invention.
Figure 9:
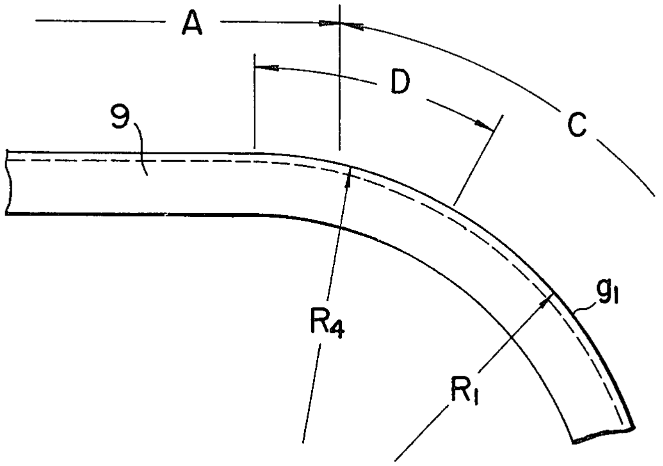
FIG. 9 is a partial enlarged view showing the essential part of the deck member shown in FIG. 8.
Figure 10:
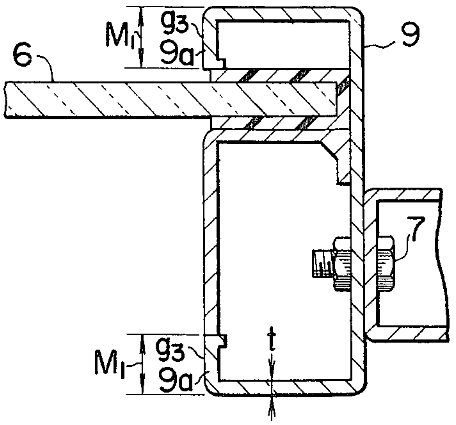
FIG. 10 is a sectional view similar to FIG. 2, but showing a balustrade according to the present invention.

FIGS. 8 to 10 show an embodiment of the present invention. In the drawings, a handrail 2 and a glass panel 6 are similar in construction to those of the prior balustrade.

According to the present invention, the balustrade member includes a major curved portion and curved portions disposed on the opposite ends of the major curved portion and having a larger radius of curvature than that of the major curved portion, and there are provided deformation preventing strips 9*a*, each of which extends a distance $M_1$ inwardly along an inner peripheral surface $g_3$ (corresponding to $g_2$ of the prior deck member) of a main deck member 9 (corresponding to the main deck member 3 of the prior art).

It is to be noted that the main deck member 9 comprises a principal curved portion having the same radii of curvature $R_1$ (at its outer periphery) and $R_2$ (at its inner periphery) as those of the prior art member, and curved portions each extending over the area D and having a radius of curvature $R_4$ ($R_4 > R_1$). The magnitude of $R_4$ is preferably about twice to five times as large as that of $R_1$, and when $R_1 = 300$ mm, $R_4$ is desirably in the range between 600 and 1500 mm.

Figure 11:
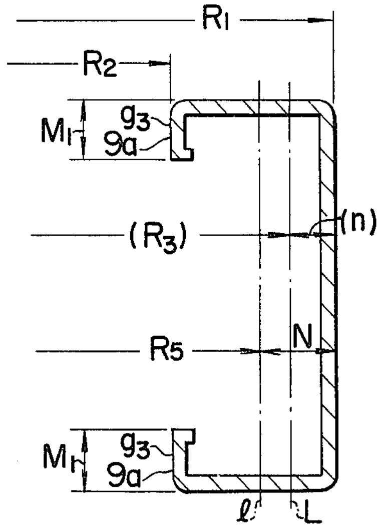
FIG. 11 is a sectional view showing the essential part of the balustrade shown in FIG. 10.

The deformation preventing strips 9*a* preferably extend a distance which amounts to one and half or more, or preferably to about three times as large as the plate thickness. The deformation preventing strips 9*a* increase the flexual rigidity of the inner peripheral surface $g_3$ (as seen from FIG. 11, the cross sectional area of the inner peripheral surface portion $g_3$ becomes larger than that of the inner peripheral surface portion $g_2$ of the prior main deck member 3), and the neutral axis l of the member is substantially displaced toward the inner peripheral surface $g_3$ to be positioned a distance N from the outer peripheral surface $g_1$ where N is larger than n ($N > n$), and the radius of curvature is $R_5$ at the central portion of the main deck member 9. Thus, the provision of the deformation preventing strips 9*a* are effective to substantially reduce the amount of contraction in the main deck member 9, thereby avoiding the production of wrinkles S.

Figure 12:
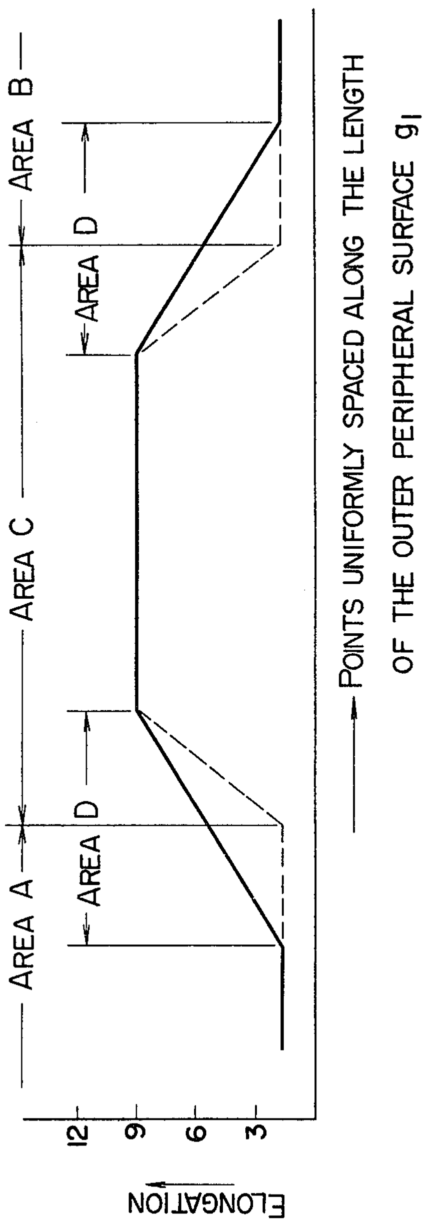
FIG. 12 is a graph showing elongation of the bent portion of the balustrade according to one embodiment of the present invention.

FIG. 12 diagrammatically shows the elongation of the main deck member 9, in which $R_1 = 300$ mm and $R_4 = 1000$ mm, in the same manner as in the prior art shown in FIG. 7. As can be seen from FIG. 12, excellent results can be obtained in a manner as presently to be discussed.

In FIG. 12, it will be seen that a change in elongation at the areas D where $R_4 = 1000$ mm is represented by a much more gentle curve than that as shown in FIG. 7 and as shown in dotted lines in FIG. 12. That is, the elongation increase over a gentle slope from 2% in the straight portions A and B to about 10%. As a result, any objectionable wrinkles (deformation corresponding to the wrinkles S in the prior art) are scarcely produced in the boundaries between the straight portions A and B and the curved portion C which is in the form of of an arc. The radius of curvature $R_4$ at the areas on both sides of the major arcuate-shaped portion having a radius of curvature $R_1$ can be suitably selected depending on the quality of material of the stainless steel plate and the stock thickness.

From the results of tests shown and described hereinabove, it will be apparent that any bending deformation such as objectionable wrinkles can be prevented from being produced on a balustrade member of stainless steel plate which is formed on the inner peripheral surface thereof with deformation preventing strips and which is shaped such that on both sides of a major curved portion having a radius of curvature $R_1$ are provided curved portions having a larger radius of curvature $R_4$ than $R_1$.

From the foregoing description, it will be appreciated that the present invention facilitates bending a balustrade member formed of stainless steel, thereby greatly increasing productivity. An additional advantage of the present invention is that there is provided a passenger conveyor having a superior durability and free from the problem relating to surface damages and errosion associated with prior balustrade members formed of aluminum.

Figure 13:
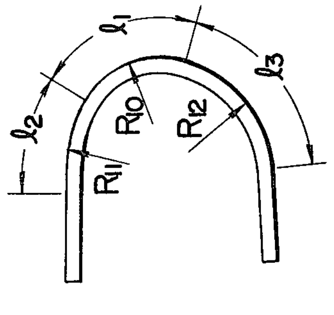
FIGS. 13 and 14 shows a part of another embodiment according to the present invention.
Figure 14:
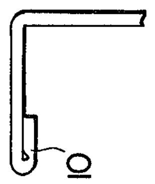

The present invention is not limited to terminal portions of a balustrade member as shown and described hereinabove, but is also applicable to any convex-shaped and concave-shaped portions thereof. Also, according to the present invention, the same results can be attained in a balustrade member, of which terminal portion includes, as shown in FIG. 13, an arcuate-shaped portion $l_1$ having a radius of curvature R10, an arcuate-shaped portion $l_2$ having a radius of curvature R11 (R11>R10) and disposed on one side of the arcuate-shaped portion $l_1$, and an arcuate-shaped portion $l_3$ having a radius of curvature R12 (R12>R11>R10) and disposed on the other side of the arcuate-shaped portion $l_1$. It should be understood that the present invention is not limited to the specific form of deformation preventing strips 9*a* shown and described hereinabove and that a deformation preventing strips 10 shown in FIG. 14, for example, can achieve the same results. The technical concept of the present invention can also be applied to balustrade members formed of steel materials and steel plates as well as stainless steel.

What is claimed is:

1. In a balustrade for use with passenger conveyors including a first deck member provided with a guide for guiding a handrail which is adapted to be moved in synchronism with an endless series of steps, a second deck member formed of sheet material connected to the first deck member, the second deck member having a U-shaped cross-sectional configuration opening in a direction opposite the handrail, each of said first and second deck members being bent to assume a first arcuate shape at landings of the passenger conveyor, the improvement comprising second arcuate-shaped portions provided adjacent opposite ends of said first arcuate-shaped portion of the second deck member, the second arcuate-shaped portions having larger radii of curvature than that of the first arcuate-shaped portion, said second deck member being bent inwardly about the opening of the arcuate-shaped portions to provide deformation preventing strips.

2. A balustrade as claimed in claim 1 wherein said deformation preventing strips are formed so as to project from the second deck member for a distance which is in excess of 1.5 times a plate thickness of the second deck member.

3. A balustrade as claimed in claim 1 wherein said first and second deck members are formed of stainless steel material.

4. A balustrade as claimed in claim 1 wherein said second arcuate-shaped portions have radii of curvature equal to two to five times as large as the first arcuate-shaped portion.

* * * * *